United States Patent
Passe

(10) Patent No.: US 9,007,420 B1
(45) Date of Patent: Apr. 14, 2015

(54) VERIFYING PRESENCE OF AUTHORIZED PERSONS DURING AN ELECTRONIC VISITATION

(71) Applicant: Securus Technologies, Inc., Dallas, TX (US)

(72) Inventor: Scott Passe, Forney, TX (US)

(73) Assignee: Securus Technologies, Inc., Dallas, TX (US)

( * ) Notice: Subject to any disclaimer, the term of this patent is extended or adjusted under 35 U.S.C. 154(b) by 0 days.

(21) Appl. No.: 14/152,831

(22) Filed: Jan. 10, 2014

(51) Int. Cl.
*H04N 7/14* (2006.01)
*H04M 1/56* (2006.01)
*H04M 3/42* (2006.01)
*G06K 9/00* (2006.01)

(52) U.S. Cl.
CPC ....... *H04M 3/42059* (2013.01); *G06K 9/00221* (2013.01)

(58) Field of Classification Search
CPC ......... H04N 7/15; H04N 7/147; H04N 7/148; H04N 7/14; H04N 7/157; H04N 7/141; H04N 7/142

USPC ............. 348/14.01, 14.08, 14.09; 379/142.05
See application file for complete search history.

(56) References Cited

U.S. PATENT DOCUMENTS

| | | | |
|---|---|---|---|
| 2006/0064324 A1* | 3/2006 | Rosenfeld et al. | 705/2 |
| 2006/0087555 A1* | 4/2006 | Boyd et al. | 348/14.09 |
| 2008/0000966 A1* | 1/2008 | Keiser | 235/382 |
| 2008/0201158 A1* | 8/2008 | Johnson et al. | 705/1 |
| 2012/0019620 A1* | 1/2012 | Lee et al. | 348/46 |
| 2012/0281058 A1* | 11/2012 | Laney et al. | 348/14.03 |
| 2013/0194377 A1* | 8/2013 | Humphries | 348/14.08 |

* cited by examiner

*Primary Examiner* — Quoc D Tran
(74) *Attorney, Agent, or Firm* — Fogarty, L.L.C.

(57) ABSTRACT

An embodiment of an apparatus may include an image capture device configured to capture an image of a user in response to a request to initiate an electronic visitation session. The apparatus may also include a processing device coupled to the image capture device and configured to perform a feature detection process on the image to verify that an actual face was present in the image, and connect the electronic visitation session in response to a determination that the actual face was present in the image.

21 Claims, 5 Drawing Sheets

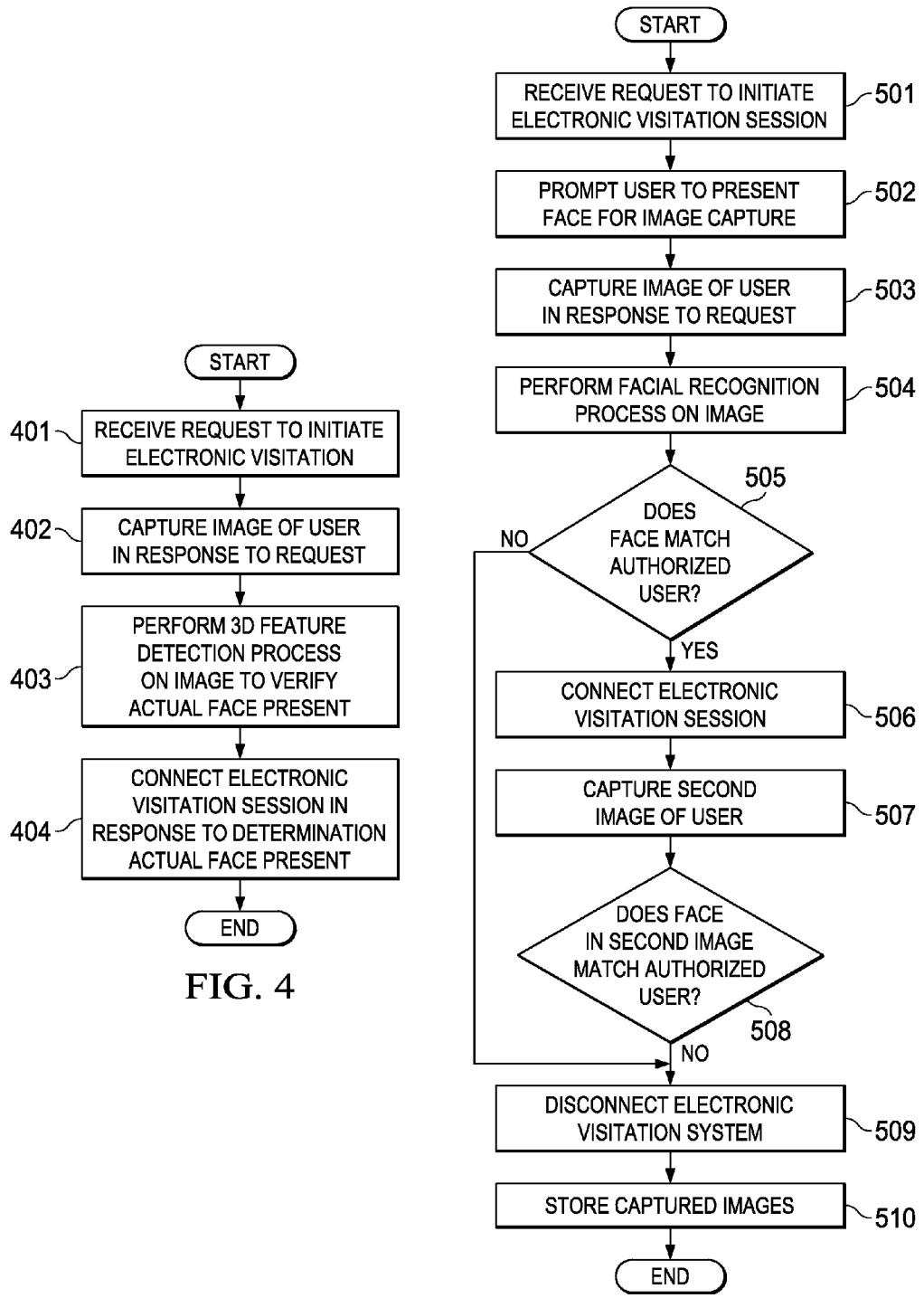

VERIFYING PRESENCE OF AUTHORIZED PERSONS DURING AN ELECTRONIC VISITATION

TECHNICAL FIELD

Embodiments of the invention are directed, in general, to interactive computing devices and, more specifically, to methods and systems for verifying presence of authorized persons during an electronic visitation.

BACKGROUND

Correctional facilities provide various options for visitation with inmates. Options include in-person visitation, room-to-room visitation through a divider, telephone visitation, and video visitation. Inmates of controlled-environment facilities are typically restricted to receiving visitation from approved persons.

When an individual visits an inmate in person, the individual's identity may be determined by providing identification documents to staff of the controlled-environment facility for verification. The identification documents may include a picture of the individual. The staff member may cross-reference the individual's name with a list of individuals on the inmate's approved visitor list.

Identification of visitors is more difficult with telephone or video visitation. The individual may provide a personal identification number, phrase, or pass code, but it is often difficult to ascertain whether the person providing the identifying information is in fact the authorized visitor without visual confirmation of the person's identity. For example, an authorized visitor may pass identification information to unauthorized individuals so that they may pose as an authorized visitor for the electronic visitation.

SUMMARY

Embodiments of the invention are directed to methods, apparatuses, and systems for verifying presence of authorized persons during an electronic visitation. In one embodiment, a method may include receiving a request to initiate an electronic visitation session. The method may also include capturing an image, with an image capture device, of a user in response to the request. Additionally, the method may include performing a feature detection process, with a processor, on the image to verify that an actual face was present in the image. Also, the method may include connecting the electronic visitation session in response to a determination that the actual face was present in the image.

An embodiment of an apparatus may include an image capture device configured to capture an image of a user in response to a request to initiate an electronic visitation session. The apparatus may also include a processing device coupled to the image capture device and configured to perform a feature detection process on the image to verify that an actual face was present in the image, and connect the electronic visitation session in response to a determination that the actual face was present in the image.

A tangible computer program product comprising computer readable instructions that, when executed by a processing device, cause the processing device to perform operations for verifying presence of authorized persons during an electronic visitation is also described.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Figure 1:
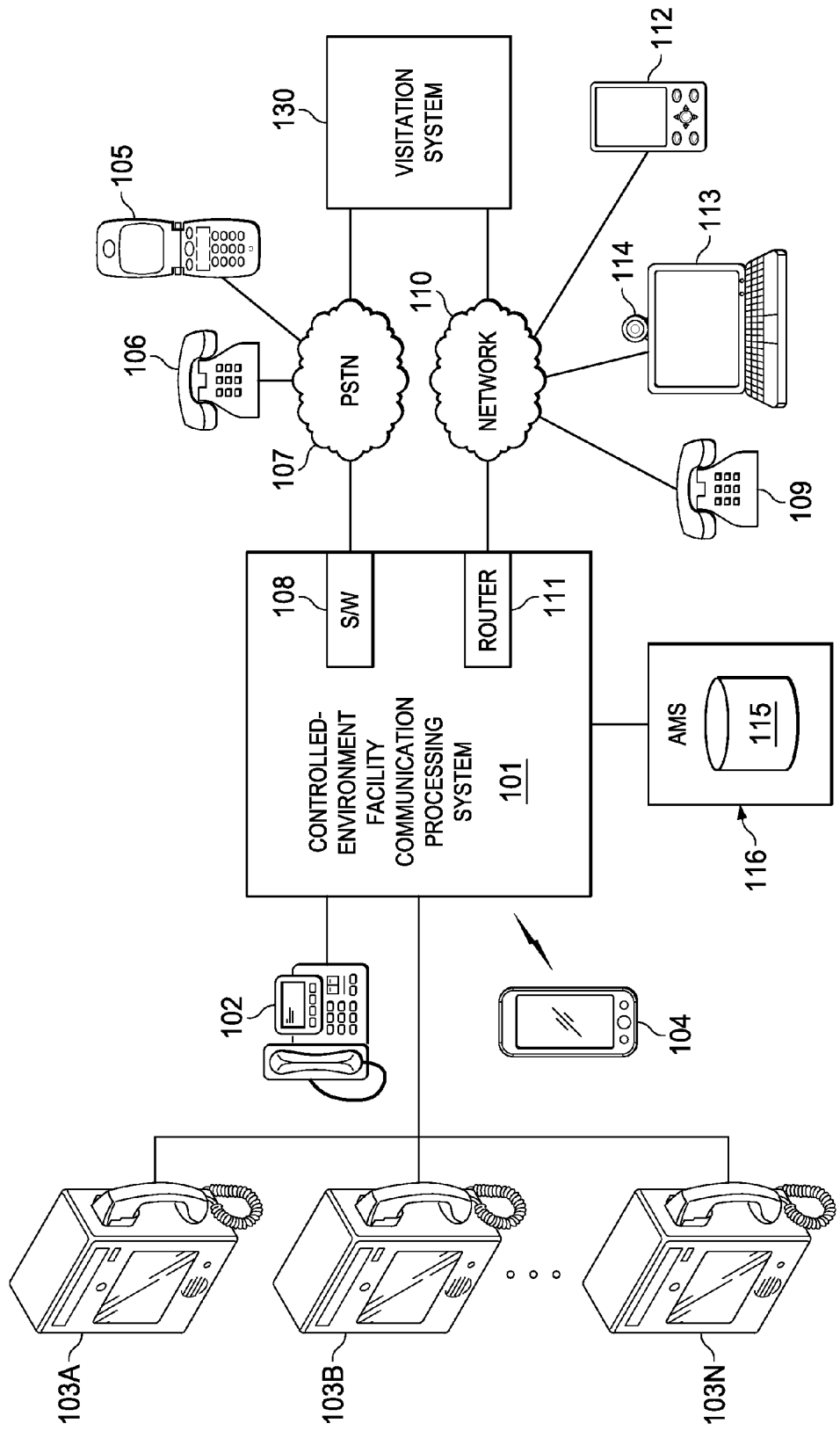

Having thus described the invention in general terms, reference will now be made to the accompanying drawings, which are not necessarily drawn to scale, and wherein:

FIG. 1 is a schematic block diagram illustrating one embodiment of a system for verifying presence of authorized persons during an electronic visitation.

Figure 2:
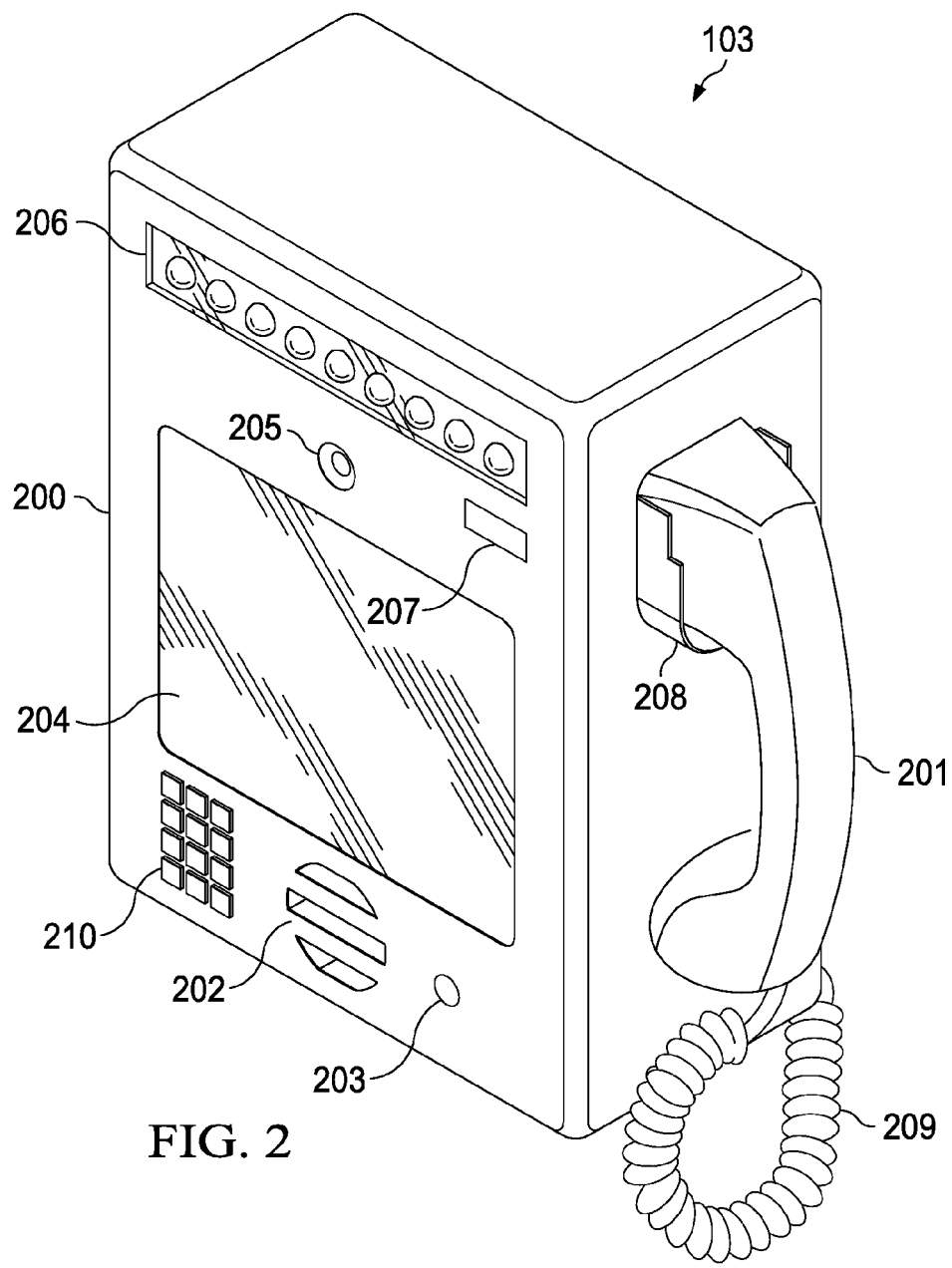

FIG. 2 is a schematic block diagram illustrating one embodiment of an apparatus for verifying presence of authorized persons during an electronic visitation.

Figure 3:
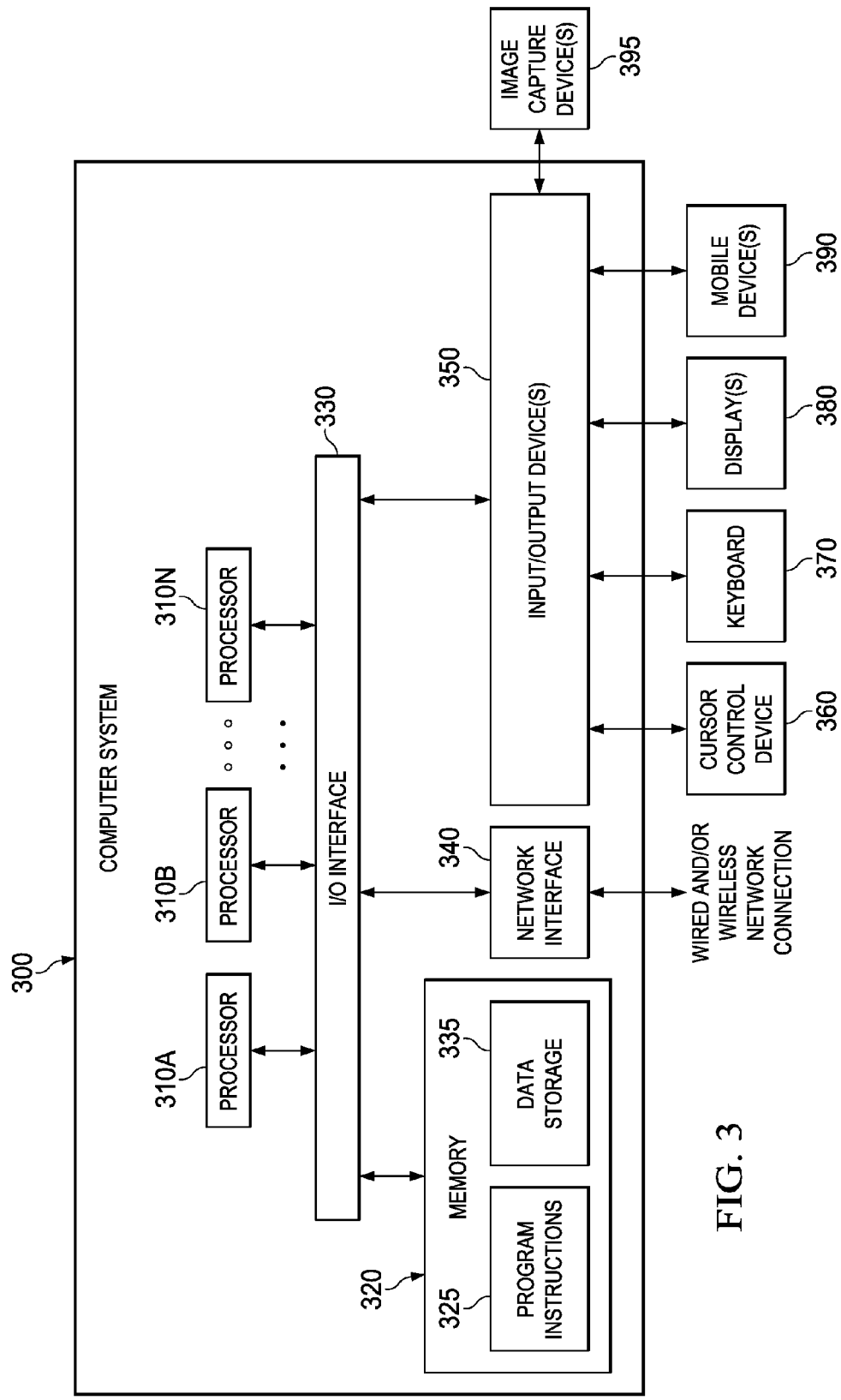

FIG. 3 is a schematic block diagram illustrating one embodiment of a processing device configurable as an apparatus for verifying presence of authorized persons during video visitation.

FIG. 4 is a schematic flowchart diagram illustrating one embodiment of a method for verifying presence of authorized persons during an electronic visitation.

FIG. 5 is a schematic flowchart diagram illustrating another embodiment of a method for verifying presence of authorized persons during an electronic visitation.

Figure 6:
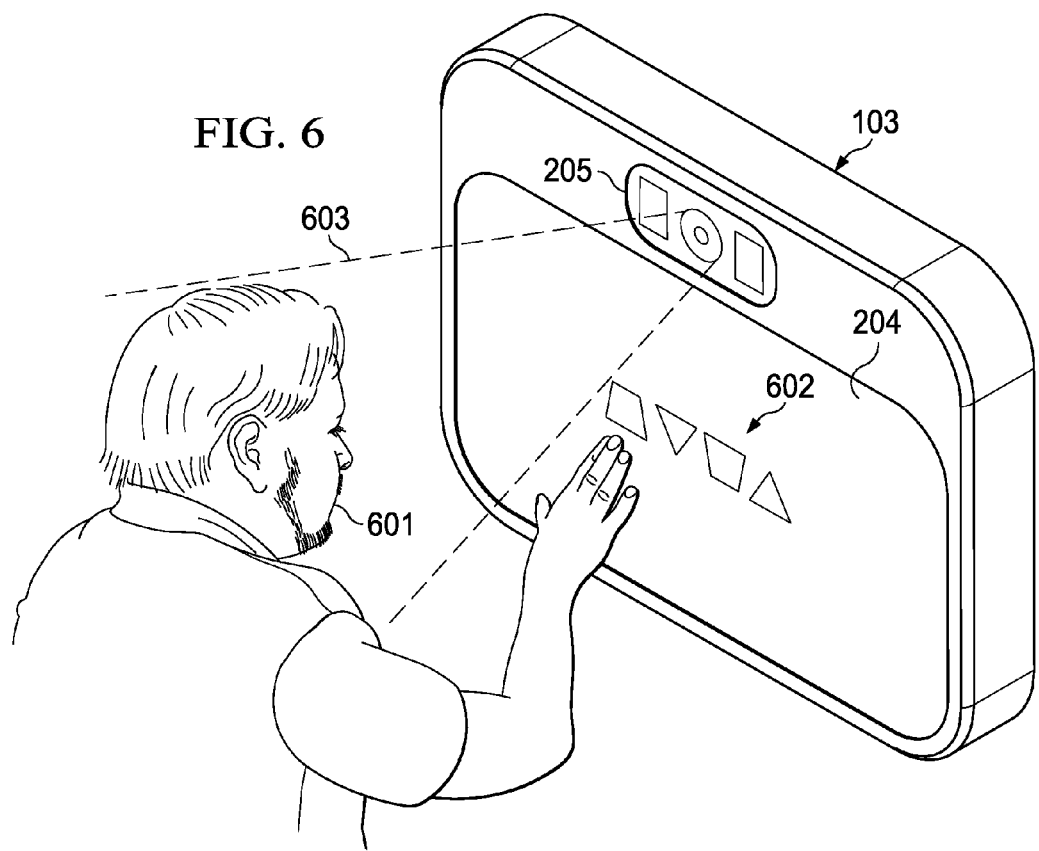

FIG. 6 is a mockup diagram illustrating one embodiment of an apparatus for verifying presence of authorized persons during an electronic visitation during use.

Figure 7:
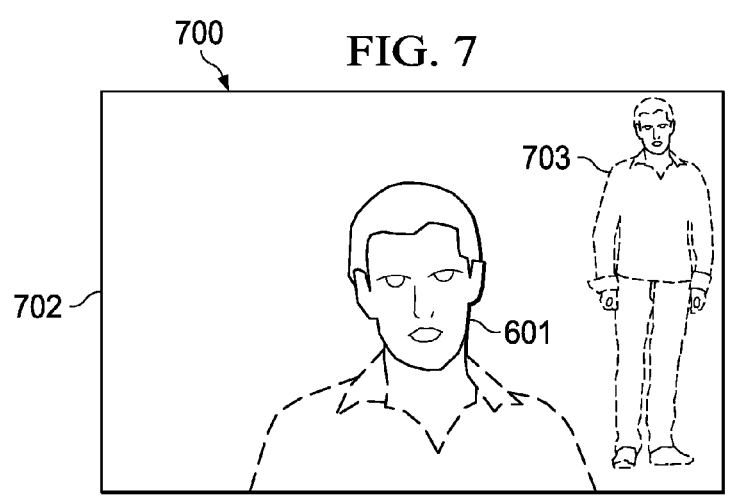

FIG. 7 is a mockup diagram illustrating one embodiment of an image frame captured by an image capture device.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

This specification discloses methods and systems for verifying presence of authorized persons during an electronic visitation. The various techniques described herein may find applicability in a wide variety of controlled-environment facilities (as well as outside of controlled-environment facilities). Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients). Other embodiments may be suitable for use in other public places, for example at ATM devices or at airport check-in kiosks.

Turning now to FIG. 1, a block diagram of an illustrative environment where verifying presence of authorized persons during an electronic visitation may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102-104.

Under the control of communication processing system 101, devices 102, 103 and 104 may be capable of connecting to a non-resident's (i.e., a person not committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on Voice-over-IP (VoIP), or packet data network 110, such as, for example the Internet. Router 111 of communication system 101 is used to route data packets associated with a call connection to destination telephone 109 or device 112.

Smart terminals 103a-n (each collectively referred to as "smart terminal 103") may have video conferencing capabilities to enable inmates to participate in video visitation sessions with non-residents of the correctional facility via video call, secure online chat, etc. In one embodiment, smart terminals 103 may include touch-screen devices. In some embodiments, smart terminals 103 may include an image capture device, such as a webcam. For example, a non-resident party may have a personal or laptop computer 113 with camera 114 (or a cell phone, tablet computer, etc.). Additionally or alternatively, device 112 may have an integrated camera and touch-screen display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each smart terminal 103 may be disposed in a visitation room, in a pod, kiosk, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by Administration and Management System (AMS) 116. In addition to PAC list(s), AMS 116 may also store inmate or resident profile data (RPD), as well as inmate financial data, such as commissary accounts.

As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some embodiments, smart terminals 103 may be implemented as a computer-based system. For example, each of smart terminals 103 may include a display, camera, and handset. The display may be any suitable electronic display such as, for example, a Liquid Crystal Display (LCD), a touch-screen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, smart terminals 103 may be configured to capture a video image of an inmate to be transmitted to a non-resident using the camera, and to display a video image of the non-resident to the inmate using the display. Smart terminals 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In addition to video visitation, smart terminals 103 may also be used by the inmate to access an inmate portal which allows access to communication processing system 101. The access available to the inmate through the inmate portal may be limited or restricted according to the inmate's permissions on the system 101. In some embodiments, the inmate may be able to access his/her personal account information, make purchases, check electronic communications such as email, and the like.

In some cases, smart terminals 103 may assume the form of any computer, tablet computer, smart phone, etc., or any other consumer device or appliance with videoconferencing capabilities.

FIG. 2 is a diagram of a video visitation device 103. In some embodiments, device 103 may be implemented as a computer-based system such as described in connection with FIG. 3. As illustrated, device 103 includes display 204, camera 205, and handset 201 coupled to device 103 via wire 209. Display 204 may be any suitable electronic display such as, for example, a Liquid Crystal Display (LCD), a touchscreen display (e.g., resistive, capacitive, etc.), or the like, whereas camera 205 may be any suitable imaging device such as, for instance, a video camera or webcam equipped with Charge-Coupled Devices (CCDs), Complementary Metal-Oxide-Semiconductor (CMOS) active pixel sensors, etc. Handset 201 may be similar to a traditional telephone handset including an earpiece portion (with a speaker), a handle portion, and a mouthpiece portion (with a microphone).

During a video visitation session, video visitation device 103 may be configured to capture a video image of an inmate to be transmitted to a non-resident using camera 205, and to display a video image of the non-resident to the inmate using display 204. Video visitation device 103 may also be configured to capture an audio signal from the inmate to be transmitted to the non-resident using the mouthpiece portion of handset 201, and to provide an audio signal from the non-resident to the inmate using the earpiece portion of handset 201. Additionally or alternatively, audio received from the non-resident may be reproduced via loudspeaker 202, and audio provided by the inmate may be captured via microphone 203. In some embodiments, handset holder or holster 208 may be configured to allow a user to securely rest handset 201 against device 103 (e.g., in an "off" position) when device 103 is not in use. Furthermore, handset holder 208 may include a mechanical or electromechanical switch or sensor (not shown) that senses when handset 201 is not resting against it (e.g. in its "on" position).

Video visitation device 103 may also include lighting device 206 and lighting sensor 207. In some embodiments, lighting device 206 may include one or more incandescent light sources (e.g., bulbs, lamps, etc.), fluorescent lamps, Compact Fluorescent Lamps (CFL), Cold Cathode Fluorescent Lamps (CCFL), high-intensity discharge sources, Light-Emitting Diodes (LEDs), or the like. Additionally or alternatively, lighting device 206 may include one or more adjustable lighting devices with variable intensity, brightness, luminance, color, tone, etc. Lighting or light sensor 207 may include one or more suitable sensors such as, for example, photoresistors, photodiodes, etc. In various implementations, camera 205 may serve as light sensor 207, and light sensor 207 may be absent.

Furthermore, it should be noted that, outside of correctional facilities, video visitation device 103 may assume the form of any computer, tablet computer, smart phone, etc., or any other consumer device or appliance with videoconferencing capabilities. For example, in the case where video visitation device 103 is a camera-enabled television (or smart phone, etc.) that does not include a dedicated lightning apparatus, the brightness of display 204 may be adjusted so that display 204 may itself act as lighting device 206 (e.g., the brightness of display 204 may be increased to also increase the illumination of the person(s) "watching" the teleconference through the television, for example, upon detection that a video connection has been established).

In the context of correctional facilities, video visitation device 103 may include one or more tampering/impact resistant or hardened elements configured to protect them from vandalism or otherwise destructive acts. For example, one or more of devices 202-207 may be protected by a transparent plastic or thermoplastic (e.g., Plexiglas, etc.) material.

In one embodiment, the video visitation device 103 may include a keypad 210 or other user input device to allow a user to enter information. For example, the user may dial a telephone number associated with a recipient of a video visitation call, enter an account number for billing purposes, or enter a Personal Identification Number (PIN) or inmate number for authentication and/or identification purposes.

FIG. 3 is a schematic block diagram illustrating one embodiment of a processing device configurable for use according to the present embodiments. In various embodiments, system 300 may be a server, a workstation, a kiosk, a smart terminal, a desktop computer, a laptop, a tablet computer, a mobile device, a smart phone, or the like. In some cases, system 300 may be used to implement visitation system 130.

As illustrated, computer system 300 includes one or more processors 310A-N coupled to a system memory 320 via an input/output (I/O) interface 330. Computer system 300 further includes a network interface 340 coupled to I/O interface 330, and one or more input/output devices 350, such as cursor control device 360, keyboard 370, display(s) 380, or mobile device(s) 390. In an embodiment, I/O interface 330 may include a touch-sensitive screen. Other devices may include, for example, image capture devices 395, surveillance cameras, microphones, antennas/wireless transducers, phone detection modules, etc. In some embodiments, each of visitation system 130, AMS 116, communication processing system 101, devices 102-104, and/or devices 105, 106, 109, 112, and 113 may be implemented using a single instance of computer system 300, while in other embodiments multiple such systems, or multiple nodes making up computer system 300, may be configured to host different portions of a given electronic device or system.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, 7 for example, those described below in connection with FIGS. 4-7, may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via I/O interface 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre-Channel SANs, or via any other suitable type of network and/or protocol.

Input/output devices 350 may, in some embodiments, include one or more display terminals, keyboards, keypads, touchpads, touch screens, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data which may be accessible by program instructions 325. In an embodiment, program instructions 325 may include software elements of embodiments illustrated in the above figures. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIG. 4 is a schematic flowchart diagram illustrating one embodiment of a method 400 for verifying presence of authorized persons during an electronic visitation. In an embodiment, the visitation system 130 receives a request to initiate an electronic visitation session as shown at block 401. In such an embodiment, the request may be received from either a smart terminal 103 a telephone 106, 109, a device 105, 112, a laptop computer 113 or other suitable communication device. Accordingly, the request may be initiated by either an inmate in the controlled-environment facility or a remote user.

In an embodiment, the visitation system 130 may instruct the user's device to capture an image of the user in response to the request as shown at block 402. In a further embodiment, the visitation system 130 may capture instruct each users' device to capture an image, so that each user may be authenticated and authorized to participate in the electronic visitation. The captured image may include either a still frame photograph or a video image. A single video frame may be captured or a plurality of video frames may be recorded. The image may be captured by camera 114, image capture device 395, or camera 205 in various embodiments.

In an embodiment, a processor 310 of visitation system 130 may perform a three-dimensional (3D) feature detection process on the captured image to verify that an actual face is present in the image as shown at block 403. A 3D feature detection process may identify three-dimensional characteristics of an image, including measurements of features of a face at a plurality of points on the image. In certain embodiments, changes in the measurements from frame to frame of a video image may indicate that the person is an actual person and not simply a photograph presented to trick the system. In still another embodiment, a plurality of still frame photograms may be captured and differences in measurements may be calculated to determine if the presented person is an actual person or a photograph.

In a further embodiment, the visitation system 130 may connect the requesting parties in an electronic visitation in response to a determination that the actual face was presented in the image as shown at block 404.

FIG. 5 illustrates another embodiment of a method 500 for verifying presence of authorized persons during an electronic visitation. In this embodiment, the visitation system 130 receives a request to initiate an electronic visitation session, such as a video visitation session, as shown at block 501. The visitation system 130 may then prompt the user to present his/her face for image capture as shown at block 502. For example, the visitation system 130 may play an audio prompt instruction the user to position his/her face in front of the camera. In an alternative embodiment, a video visitation device, such as smart terminal 103 or laptop 113 may display a textual prompt to the user. In still a further embodiment, an image capture guide, such as an oval overlaid on a video image, may be displayed to instruct the user regarding a position for presenting his/her face for image capture. The image capture device 395 may then capture an image or a series of images or video frames as shown at block 503.

Processor 310 of visitation system 130 may then perform a 3D facial recognition process on the image(s) to affirmatively identify the user as an authorized user as shown at block 504. For example, the visitation system 130 may verify that the inmate present matches a PIN entered by the inmate and that the remote user is a member of the inmate's PAC list. If the face matches an authorized user as shown at block 505, then the visitation system 130 may connect the parties on an electronic visitation session as shown at block 506. For example, an electronic visitation session could include a telephone call, a video visitation, an instant message visitation, etc. If the faces don't match authorized persons, then the visitation session may be denied or disconnected as shown at block 509. In such embodiments, the captured images may be stored, as shown in block 510, in a data storage device, such as database 115, for further review.

If the visitation session is connected at block 506, then a second image of the users may be captured at a second time as shown at block 507. The second time may be at a predetermined time after connection of the visitation session. Alternatively, the second time may be randomly selected to avoid predictability. The second image may be processed according to the 3D facial recognition process, and it may be further determined whether the face in the second image matches an authorized user as shown at block 508. If the face does not match an authorized user, then a responsive action may be taken. For example, the visitation session may be disconnected by visitation system 130 as shown at block 509. In such an embodiment, the second captured image may also be stored in a data storage device as shown at block 510. Additional responsive actions may include sounding an alert, generating a notification to the users and/or an administrator of the visitation system 130. Additionally, responsive action may include monitoring of the visitation session by a live agent, recording of the visitation session, etc. One of ordinary skill in the art may recognize additional responsive actions which may be taken.

FIG. 6 is a mockup diagram illustrating one embodiment of an apparatus for verifying presence of authorized persons during an electronic visitation during use. This embodiment may also further demonstrate the method 500 described in FIG. 5. In this embodiment, the method 500 is carried out, at least in part, by a smart terminal 103. When an inmate attempts to participate in an electronic visitation session, the smart terminal activates the webcam 205 and requires that the inmate show his/her face 601. During the use of the electronic visitation session, the visitation system 130 may monitor webcam 801 to ensure that the actual authorized person's face 601 is still present, for example, while interacting with content 602 on smart terminal 103. If the monitoring application no longer detects an actual authorized face 601 within camera field of view 603, the existing login session and display information are closed.

This solution may utilizes the integrated webcam 205 of an inmate smart terminal 103 and utilizes algorithms for detecting 3D facial features to verify that a human face is presented to the camera 205. In such an embodiment, facial detection may be required before and after logging into select functions. While logged into one or more select functions, the inmate may maintain their face 601 within the view of the webcam 205.

In a further embodiment, a small window may be presented, into which is displayed the image being captured by the webcam 205 to assist the inmate in properly placing their face in view of the webcam 205.

In still a further embodiment, facial identification processes may be performed. Within this variation, not only is facial detection required but the face must be matched against a known likeness of the inmate. A match to the known face 601 of the inmate then acts not only as a means of maintaining the electronic visitation session but also as an additional level of confirmation of the inmate's identity so as to preclude unauthorized use.

FIG. 7 illustrates a mockup of a captured image 700. As illustrated, the captured image 700 may include a face 601 of a user. In a further embodiment, the image may include a second face on a second person 703 in the background 702 of the image 700. In an embodiment, the visitation system 130 may perform facial recognition on any faces present in the image 700 to ensure that all parties to the visitation are authorized to participate and to ensure that no other inmates are eavesdropping on the electronic visitation session.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
receiving a request to initiate an electronic visitation session;
capturing an image, with an image capture device, of a user in response to the request;
performing a feature detection process, with a processor, on the image to verify that an actual face was present in the image;
connecting the electronic visitation session in response to a determination that the actual face was present in the image;
capturing a second image of the user with the image capture device during the electronic visitation session;
performing the detection process on the second image, with the processor, to verify that the actual face is present in the second image.

2. The method of claim 1, further comprising prompting the user to face the image capture device in response to receiving the request.

3. The method of claim 1, wherein the image capture device is configured to capture a still-frame image.

4. The method of claim 1, wherein the image capture device is configured to capture a video frame.

5. The method of claim 1, wherein feature detection process further comprises a facial recognition process.

6. The method of claim 1, further comprising storing the image captured by the image capture device in a data storage device.

7. The method of claim 1, wherein the image capture device comprises a component of a video visitation system located within a controlled-environment facility.

8. The method of claim 1, wherein the image capture device comprises a component of an electronic device located outside of the controlled-environment facility.

9. The method of claim 1, further comprising performing a responsive action in response to a determination that the actual face is not present in the second image.

10. The method of claim 1, wherein the feature detection process utilizes three-dimensional (3D) feature detection.

11. An apparatus comprising:
an image capture device configured to capture an image of a user in response to a request to initiate an electronic visitation session;
a processing device coupled to the image capture device and configured to:
perform a feature detection process on the image to verify that an actual face was present in the image;
connect the electronic visitation session in response to a determination that the actual face was present in the image;
capture a second image of the user with the image capture device during the electronic visitation session;
perform the feature detection process on the second image to verify that the actual face is present in the second image.

12. The apparatus of claim 11, wherein the processing device is further configured to prompt the user to face the image capture device in response to receiving the request.

13. The apparatus of claim 11, wherein the image capture device is further configured to capture a still-frame image.

14. The apparatus of claim 11, wherein the image capture device is further configured to capture a video frame.

15. The apparatus of claim 11, further comprising the processing device being configured to perform a facial recognition process.

16. The apparatus of claim 11, wherein the processing device is further configured to store the image captured by the image capture device in a data storage device.

17. The apparatus of claim 11, wherein the image capture device comprises a component of a video visitation system located within a controlled-environment facility.

18. The apparatus of claim 11, wherein the image capture device comprises a component of an electronic device located outside of the controlled-environment facility.

19. The apparatus of claim 11, further comprising performing a responsive action in response to a determination that the actual face is not present in the second image.

20. The apparatus of claim 11, wherein the processing device utilizes three-dimensional (3D) feature detection to perform the feature detection process on the image to verify that an actual face was present in the image.

21. A method comprising:
receiving a request to initiate an electronic visitation session;
capturing a first image, with an image capture device, of a user in response to the request;
performing a three-dimensional (3D) facial recognition process on the first image, with a processor, to identify the user;
connecting the electronic visitation session in response to a determination that a face in the first image matches an authorized user;
capturing a second image of the user, with the image capture device, during the electronic visitation session;
performing the 3D facial recognition process on the second image, with the processor, to identify the user; and
performing a responsive action in response to a determination that a face in the second image does not match an authorized user.

* * * * *